Patented Sept. 21, 1954

2,689,781

UNITED STATES PATENT OFFICE 2,689,781

PRODUCTION OF TITANIUM DIOXIDE PIGMENTS

Holger H. Schaumann, Newark, Del., assignor to E. I. du Pont de Nemours and Company, Wilmington, Del., a corporation of Delaware No Drawing. Application July 5, 1951, Serial No. 235,379

6 Claims. (Cl. 23—202)

This invention relates to the production of improved titanium dioxide pigments and more particularly to novel methods for obtaining such pigments through the simultaneous vapor phase oxidation under controlled conditions of titanium tetrachloride and metallic aluminum.

Early vapor phase oxidation processes for the production of $TiO_2$ provide an acidic, reactive form of product; that is, one having a pH of from 4–5. This undesired acidity was due to either free halogen, that is, chlorine, or unreacted halide present, and rendered the product ill-suited for use in many pigment applications, especially coating compositions such as paints, enamels, lacquers, etc. Complete removal of the acidic constituents to render the product amenable for use in these applications could not be effected except through resort to expensive, time-consuming after-treatment operations such as with an aqueous alkaline neutralizing solution (ammonium hydroxide, sodium carbonate, sodium hydroxide, etc.) followed by drying, calcination and mechanical grinding of the neutralized product to eliminate undesired gritty aggregates and yield a product having satisfactory fineness. Even with these treatments, the pigment displayed an objectionable tendency to discolor or yellow when employed in paints and enamels of the baking variety.

In the copending application of Ignace J. Krchma and myself, Ser. No. 763,738, filed July 25, 1947 (issued July 10, 1951 as U. S. Patent No. 2,559,638), an improved type of substantially neutral and yellowing-resistant titanium dioxide pigment having excellent fineness characteristics is obtained through the co-oxidation in the vapor phase of titanium tetrachloride and relatively small amounts of aluminum chloride, the reaction being effected in the presence of relatively small amounts of water vapor. Although the pigment properties of the product from the methods disclosed in said application are commercially satisfactory, it has been found necessary in such process to resort to a preheating of the titanium tetrachloride reactant to in excess of 400° C. to obtain a rutile type of pigment. Preheat temperatures above 400° C. impose severe limitations on materials of construction employed in the apparatus in which the oxidation is carried out, due to the corrosive nature of the titanium tetrachloride and the stringent requirements in regard to the amount of heavy metal contamination that can be tolerated in commercial-grade titanium dioxide pigments. These conditions and requirements have in consequence limited the choice of materials of construction for titanium tetrachloride preheat to fragile, non-metallic type of corrosion-resistant materials such as fused silica. Heat exchangers constructed of fused silica for commercial operations are extremely difficult to fabricate and very expensive to maintain.

Numerous practical problems also arise in the co-oxidation of a vaporous mixture of aluminum chloride and titanium tetrachloride wherein the mixture is obtained by vaporizing a solution of aluminum chloride and titanium tetrachloride. Aluminum chloride, because of its extreme hygroscopicity, is a very difficult material to handle, store, add, and mix with liquid $TiCl_4$. The amount of aluminum chloride in the vaporous mixture is also difficult to control due to the varying amounts of non-volatile products of aluminum chloride hydrolysis. These hydrolysis products cause an undesired build-up to occur on the heat transfer surfaces of the apparatus employed in vaporizing the aluminum chloride-titanium tetrachloride solution. Severe corrosive conditions are encountered in this vaporization operation due to the activity of the hot aluminum chloride-titanium tetrachloride solution.

It is among the objects of this invention to overcome the above and other disadvantages of prior vapor-phase oxidation processes for producing titanium dioxide pigments, and to provide in particular a novel and improved method for producing rutile-type pigment quality $TiO_2$ by reacting titanium tetrachloride in the vapor phase with an oxygen-containing gas while simultaneously oxidizing minor quantities of molten aluminum metal. A specific object is to provide an improved method for obtaining a high-quality rutile type of $TiO_2$ pigment without recourse to the high temperature preheating of the titanium tetrachloride reactant heretofore required in prior vapor-phase oxidation processes. A further object is to obtain a substantially neutral type of rutile $TiO_2$ product having a desirably softer texture and adapted to be readily ground to superfineness to yield a final pigment having desired particle size and particle size distribution. A further object is to provide a $TiO_2$ pigment possessing exceptionally high and improved hiding power, tinting strength, color, and other essential pigment characteristics as well as one which can be readily employed in all types of coating compositions wherein it will inherently improve the film color of such compositions and will be found to be highly risistant to discoloration, particularly of the type encountered in the baking of oleoresinous and synthetic resin coating vehicles. Other objects and advantages will be evident from the ensuing description of the invention.

These and other objects are realized in this invention which broadly comprises producing pigment-quality rutile containing a small amount of $Al_2O_3$ by reacting within a closed reaction zone over a controlled time period and at temperatures ranging from about 800–1400° C. vaporized titanium tetrachloride and molten aluminum metal with an oxygen-containing gas, and thereafter recovering the resulting $TiO_2$ product and subjecting it to pigment-finishing treatment.

In a more specific and preferred embodiment, the invention comprises obtaining pigment-quality rutile by reacting in the vapor phase and at temperatures ranging from about 900–1300° C. titanium tetrachloride and an amount of molten aluminum metal equivalent to from 0.1% to 2.0% by weight of the titanium tetrachloride, with an oxygen-containing gas in the presence of from 0.1% to 5% by volume (based on the total volume of gases present) of water vapor, subjecting the resulting $TiO_2$ product to a mild (500–700° C.) calcination treatment, and then to a milling treatment.

In one practical adaptation of the invention, vaporized anhydrous titanium tetrachloride is continuously introduced into a suitable corrosion-resistant reaction vessel with the reaction zone maintained at a substantially constant temperature of about 1250° C. Concurrently, droplets of molten aluminum metal in amount equivalent to from 0.1% to 2.0% by weight of the titanium chloride are separately introduced into said vessel, the titanium tetrachloride and molten aluminum metal droplets becoming thoroughly commingled and substantially completely reacted therein with an oxygen-containing gas, such as air, which preferably has been enriched with from, say, 0.1% to 5% of water vapor. As a result of intimate and rapid mixing of the reactants, substantially complete oxidation of the titanium tetrachloride and aluminum metal takes place with formation of a $TiO_2$ product containing 0.5% to about 10% $Al_2O_3$. Prior to its introduction, the oxygen-containing gas is preferably preheated to temperatures up to about 1350° C., without recourse to preheating the titanium chloride reactant to temperatures of in excess of, say, 400° C. It is unnecessary to preheat the minor amount of aluminum metal required but this reactant must be in finely dispersed form as a spray of minute liquid droplets in the reaction zone. To achieve this, the aluminum metal may be sprayed directly into the reaction zone in the molten state or it can be admitted thereto as solid wire or bar, to be melted by radiant heat from the reaction and dispersed into the reaction zone by the oxidizing gas. The gaseous pigment suspension (at temperatures from about 1100° C. to 1300° C.) issuing from the oxidation reactor is immediately cooled to a temperature below 600° C. in order to prevent $TiO_2$ pigment particle size growth which would occur due to cementation or sintering of loosely-bound pigment aggregates. This quick quenching can be effected by means of any conventional, effective cooling operation, such as by recirculating cooled product gases from the system and directly commingling them with the highly heated pigment suspension. Alternatively, such quenching can be effected by dispersing or entraining in the hot gaseous titanium-containing suspension a sufficient charge or blast of relatively cold, finely divided particles of a non-reactive, inert, solid material, such as silica, and as contemplated in the copending application of I. J. Krchma, Serial No. 751,709, filed June 2, 1947. The quantity of cooling products employed should, as noted, be sufficient to drop the temperature of the hot suspension to below about 600° C. and within a time period of less than 5 and not to exceed 10 seconds' time from its discharge from the reactor. The $TiO_2$ pigment product can be recovered from the cooled reaction products by conventional separatory treatments, including cyclonic or electrostatic separating media, filtration through porous media, or the like.

In effecting the contemplated mixing and reaction, resort can be had to any conventional, corrosion-resistant type of mixing and reaction vessel provided it is of such design, construction and dimension that a continuous flow of reactants and products of reaction within and through its oxidation chamber can be effected and such control can be exercised over the velocities, mixing rates, temperatures, and reactant retention times employed that, on the average, the reactants will remain in said chamber for but a limited, short period of time, e. g., long enough to afford a substantially complete reaction but less than the period of time in which occurrence of undesired pigment particle size growth would take place. With the employment of temperatures of the range indicated, reactant retention times of from .05–1 second are preferred for use since complete conversion of the mixed halides to their corresponding oxides occurs within such time. Preferably also, and to insure optimum results hereunder, resort is had to a slot-jet type of apparatus of the type disclosed in the copending application of Oswin Burr Willcox, Ser. No. 763,286, filed July 24, 1947. This comprises an elongated type of mixing and reaction vessel having a relatively restricted cross section and into which the reactants are separately fed at controlled velocities for quick mixing and reaction by continuously charging one reactant into the other while the latter is being charged into the reaction zone in the form of a relatively thin, sheeted stream flowing from the periphery of the reactor vessel and in a direction angular or radially to the axis or direction of flow of said other reactant through the vessel.

The recovered, modified or composite type of $TiO_2$ pigment product which may contain from .5–10% by weight of $Al_2O_3$ is then subjected, in the dry state, to relatively mild calcination treatment and until removal of undesired chlorine is effected. By the term "mild," a calcination temperature below that at which the primary $TiO_2$ particles grow by sintering is intended, e. g., such temperature should not exceed about 800° C. and usually ranges from 600–750° C. A temperature of about 700° C. s preferred for this purpose. The chlorine-freed product is then subjected to milling, grinding or disintegration treatment to remove aggregates and can be finished in conventional milling equipment, such as a hammer or roller type mill or a disintegrator to obtain a fine-textured pigment. In its finished state, the pigment is of uniformly small size with its average particle size radius ranging from .05 to .5 micron, and preferably from .1 to .25 micron. Being substantially neutral, small in particle size, soft-textured, and inherently high in tinting strength, color, opacity and other essential pigment properties, it is readily adapted for wide use in pigment applications, especially in paints, enamels, finishes, or other types of coating compositions. Similarly, it is highly suitable for use as a delusterant for rayon, nylon, or other artificial fibers or silks or as an essential pigmenting ingredient in printing inks, rubber, plastics, and other uses. Due to its high resistance toward discoloration and yellowing, it is outstandingly useful in high temperature or baked refrigerator types of paints and enamels.

To a clearer understanding of the invention, the following examples are given. These are merely illustrative and should not be construed as limiting the underlying principles of the invention:

*Example I*

Titanium tetrachloride vapor at a temperature of 300° C. was continuously admitted at a rate equivalent to 100 parts by weight per hour to the upper portion of a vertical reaction chamber constructed of nickel and cooled by means of a circulating molten salt mixture. Simultaneously, humidified air, preheated to 1050° C. and containing water vapor controlled to 1.0% by volume, was continuously admitted to said chamber and at a rate equivalent to 19 parts by weight of $O_2$ per hour, such admission being effected through a separate inlet adjacent to the titanium tetrachloride inlet. Simultaneously also, molten aluminum at a temperature of about 775° C. was continuously sprayed into the converging streams of humidified air and titanium tetrachloride within the reaction zone through a ceramic-lined nozzle and by means of an annular stream of air, said metal being added at a rate of .95 part by weight per hour. The three reactant streams were rapidly mixed in the upper portion of the reactor with the heat of reaction maintaining temperature of 1260° C. in the reaction zone. The flow rates used provided an average retention time of reactants and products within the reaction chamber of about .15 second. The gaseous suspension of $TiO_2$—$Al_2O_3$ pigment formed in the reactor was discharged from the lower portion of the cylindrical chamber at a temperature of about 1180° C. and was subjected to quick cooling by quenching at the reactor outlet by means of mixing directly therewith recirculated, filtered and cooled product gases in the ratio of 30 parts by weight per hour. The partially cooled gaseous suspension was then passed through a water-jacketed cooling conduit. The composite titanium dioxide pigment was then separated from the gaseous products by filtration following which it was subjected to calcination at a temperature of 650° C. for 2 hours and dry grinding in a fluid energy mill.

The operation was conducted continuously with the corrosion problems arising from preheating $TiCl_4$ to above 400° C. in prior processes being completely absent. A substantially 100% conversion of the titanium tetrachloride and aluminum to their respective oxides was obtained to provide a composite rutile pigment containing about 95.7% $TiO_2$ and 4.3% $Al_2O_3$ having exceptional resistance to yellowing in enamel finishes.

*Example II*

Substantially pure $TiCl_4$ was vaporized under 15 p. s. i. gauge pressure and was then fed continuously without further preheating at a temperature of 150° C. to a slot jet type of mixing and reaction vessel, constructed of cooled nickel of a type disclosed in the above-identified copending application of O. B. Willcox. This device comprises a vertical cylindrical vessel having an internal diameter of 17 inches near the top of which was provided a continuous transverse peripheral slot opening ¼ inch in width. The $TiCl_4$ vapor was admitted to the vessel through the slot opening in the form of a sheeted stream and at a rate of 10,000 lbs. per hour. Simultaneously, air preheated to 1080° C. and containing water vapor controlled to .5% $H_2O$ by volume, was separately and continuously fed at a rate of 8740 lbs. per hour into the vessel through a separate inlet above the slot from which it flowed downwardly past said slot and into the reaction zone. Also simultaneously, molten aluminum metal was sprayed continuously at a rate of 125 lbs. per hour into the air stream through a ceramic-lined nozzle and just above the peripheral slot admitting the $TiCl_4$ vapor. The reactants became rapidly and intimately mixed at a point immediately below the slot inlet. The reaction zone was maintained at a temperature of 1250° C. and the reactants and products remained within said zone for a period of .12 second. The resulting gaseous suspension of composite rutile $TiO_2$ pigment containing 5.7% $Al_2O_3$ on discharge from the reactor was quickly cooled (in less than 2 seconds) to below 600° C. by recirculated, cooled gases. The suspension was then further cooled and the pigment recovered in filter containers. It was then calcined at 700° C. for 4 hours and dry ground in a fluid energy mill.

The final pigment had a pH value of 7.0 and was excellent in color and texture. Its resistance to yellowing in refrigerator and architectural enamel finishes was outstanding. As in the instance of Example I, problems incidental to preheating $TiCl_4$ in accordance with prior practice were not encountered nor were the difficulties experienced with $AlCl_3$ use met with.

As disclosed in the aforesaid U. S. application Ser. No. 763,738 and U. S. Patent 2,488,439, air suitably humidified by $H_2O$ addition comprises a preferred type of gaseous oxidizing agent for use in the invention. Other types of oxidizing gases containing free oxygen ($O_2$), and preferably those containing a controlled amount of moisture, also can be employed, as can mixtures of such gases. Useful types include oxygen, oxygen-enriched air, or mixtures of oxygen or air with various inert gases (nitrogen, $CO_2$, etc.). Generally, the process is operated with amounts of oxidizing gas sufficient to provide about 10% excess oxygen over the theoretical, to obtain a product gas containing about 30% $Cl_2$ by volume, when air is used as the source of oxygen, and 90–95% $Cl_2$ when gaseous oxygen is employed, with but small or minor amounts of $O_2$ and HCl. The use of oxygen-enriched air will produce chlorine concentrations intermediate between 30 and 90% $Cl_2$ gas in the oxidation products. However, the invention is not limited to this, but can be operated using either excess or deficient concentrations of the oxidizing or titanium tetrachloride reactant. In event of excess chloride use, the latter can be separated from the oxidation products and reused in the system.

While the concentration of water vapor present in the oxidizing medium preferably ranges from .1–3%, such amount can vary from, say, .05% to 5%, but should not exceed 10%, said amounts being based on the total volume of gaseous reactants being charged to the reaction zone. Again, while the desired amount of water vapor is preferably introduced into the reaction zone via and as a component part of the oxidizing agent, it can be separately fed thereto, or other methods can be resorted to for insuring the presence of a sufficient quantity of $H_2O$ during the vapor phase oxidation reaction. It being essential and critical to the invention that the water vapor be present in controlled quantity, any method insuring the presence of such quantity or which will lower the amount present, if too high, is contemplated as useful herein. Thus, the water vapor can be continuously added, either directly and independently to the reaction zone itself, or as a component of the oxidizing medium being employed and introduced into such zone. Other methods for insuring the presence of the requisite amount of water vapor during the reaction, more particularly disclosed in said Schaumann application, can also be employed, as can the process of forming the water vapor in situ of the reactants and through free hydrogen presence in the reaction zone, as disclosed in U. S. Patent 2,483,440.

While reaction zone temperatures ranging from 900–1300° C. are preferred for use, temperatures ranging from about 800° C. to 1400° C. can be resorted to. These temperatures can be readily obtained in a large-scale, commercial type of operation, by proper adjustment of the ratio of aluminum to titanium tetrachloride and preheat temperature of the oxidizing gas and without recourse to preheat temperatures above 400° C. for the titanium tetrachloride reactant. Any conventional type equipment can be used in the preheating operation, including any suitable type of electrical resistance apparatus or devices which will pass the reactants in direct or indirect heat exchange relationship with a heat-imparting medium. A useful type for the purpose comprises one in which the reactants pass over heat transfer surfaces the opposite faces of which are heated directly by combustion of fuels or indirectly by circulation of a suitable heat transfer medium. The quantity of heat released by the reaction of the metallic aluminum is useful in maintaining the overall oxidation reaction.

Normally, the oxidation reaction is effected under atmospheric pressures but if desired it can be conducted under super or subatmospheric pressures. Similarly, any type or size of reaction vessel conforming to the scale of operation intended can be used, with the equipment being of such design and dimension as will permit a continuous flow of reactants through the reaction vessel, especially the oxidation chamber, to insure a continuous, as distinguished from a discontinuous or batch, type of operation. Obviously, while a continuous process is preferred, a batch or semi-continuous type of operation can also be resorted to.

The time of retention of the reactants within the reaction zone is quite important and critical for production of pigment-quality $TiO_2$. Generally, the retention time of all reactants within the mixing and reaction zone must not exceed about 5 seconds nor be less than about .01 of a second, with a preferred time, to insure recovery of an optimum quality pigment, ranging from .05 to 1 second.

The titanium tetrachloride and aluminum metal reactants used preferably comprise high-purity materials free of contaminating impurities, such as those of vanadium, iron, copper, etc., and which will thus insure production of a product exhibiting exceptionally high pigment whiteness and brightness characteristics. The molten aluminum employed in the reaction is at a temperature above the melting point (about 660° C.) thereof but substantially below its boiling or vaporization point. That is, it is at a temperature at which the aluminum is maintained in liquid, unvaporized state so that avoidance of undesired $TiO_2$ coalescence and discoloration as well as incomplete reaction will be had. The amount of aluminum used is relatively small, e. g., is equivalent to from .1% to 10%, calculated as the oxide and based upon the amount of $TiO_2$ pigment under production. The $TiCl_4$ can be obtained, for instance, by chlorinating a titaniferous ore, such as ilmenite, and purifying the product through careful fractional distillation. Examples of other useful titanium tetrachloride reactants comprise the pure, anhydrous titanium tetrachloride (freed of copper, vanadium, iron, and other impurities) contemplated in U. S. Patent 2,062,133, or the product resulting from soya bean oil treatment as disclosed in U. S. Patent 2,230,538.

I claim as my invention:

1. A process for producing pigmentary rutile titanium dioxide which comprises reacting vaporized titanium tetrachloride heated to a temperature not exceeding 400° C. and a small amount of molten aluminum metal in dispersed state with an oxygen-containing gas having a regulated moisture content ranging of from .05–10% by volume of $H_2O$, effecting said reaction in a closed reaction vessel and at temperatures ranging from about 800–1400° C., and subjecting the recovered $TiO_2$ product to pigment-finishing treatment.

2. A process for producing pigment quality rutile pigmentary titanium dioxide containing from about .5% to 10% of aluminum oxide, comprising reacting at temperatures ranging from about 800–1400° C. and over a controlled time period within a reaction zone vaporized titanium tetrachloride heated to a temperature not exceeding 400° C. and molten aluminum metal in dispersed state with an oxygen-containing gas enriched with from .05–10% by volume of added water vapor, subjecting the recovered pigment to a mild calcination treatment, and thereafter to disintegration milling.

3. A process for producing pigment quality rutile titanium dioxide which comprises oxidizing vaporous titanium tetrachloride preheated to a temperature of not to exceed 400° C. with a heated humidified oxygen-containing gas in which from .05–10% by volume of added $H_2O$ is present and in the presence of an amount of molten aluminum metal in dispersed state equivalent to from .1–10% by weight, calculated as the oxide and based on the $TiO_2$ product, effecting said reaction in a closed reaction zone at temperatures ranging from about 900–1400° C. and over a time period of retention of reactants in said zone ranging from .01–5 seconds, recovering the titanium dioxide product from the resulting products of reaction and subjecting it to pigment-finishing treatment.

4. A process for producing pigment quality rutile titanium dioxide which comprises oxidizing vaporous titanium tetrachloride preheated to a temperature of not to exceed 400° C. with a heated humidified oxygen-containing gas containing from .1–5% by volume of added water vapor is present and in the presence of from .1% to 2% by weight of dispersed droplet of molten aluminum metal based on the amount of titanium tetrachloride reactant, effecting said reaction in a closed reaction zone at temperatures ranging from 900–1300° C. and over a time period of retention of reactants in said zone of from .01–5 seconds, recovering the titanium dioxide pigment from the resulting products of reaction and subjecting it to pigment-finishing treatment.

5. A process for producing pigment quality rutile titanium dioxide comprising reacting at temperatures ranging from 800–1300° C. vaporized titanium tetrachloride preheated to a temperature of not to exceed 400° C. and an amount of dispersed droplets of molten aluminum metal equivalent to from .1% to 2% by weight, based on the amount of titanium tetrachloride reactant, effecting said reaction in a closed reaction vessel wherein the reactants and reaction products are retained for a period ranging from .01 to not to exceed 5 seconds and in the presence of an oxygen-containing gas having a moisture content of from .1% to 5% by volume of added water vapor, based on the total volume of gases being reacted, calcining the recovered $TiO_2$ product at temperatures ranging from about 500–800° C., and then subjecting the calcined product to milling treatment to improve its fineness and texture.

6. A process for producing pigment quality rutile titanium dioxide having improved baking discoloration and yellowing-resistance characteristics when employed in coating compositions which comprises reacting at temperatures ranging from 900–1300° C. vaporous titanium tetrachloride preheated to a temperature of not to exceed 400° C. and dispersed droplets of molten aluminum metal equivalent to from .1% to 10%, calculated as the oxide, with air containing a regulated amount, ranging from .1% to 5% by volume of water vapor, based on the total volume of gaseous reactants, effecting said reaction within a closed reaction vessel over a time period ranging from .01 to 5 seconds, quickly quenching the $TiO_2$-containing products of reaction upon their discharge from the reaction zone to a temperature below 600° C., calcining the quenched product in the dry state at temperatures ranging from 500–700° C. until it becomes chlorine-free, and then subjecting the calcined product to disintegrating milling treatment to improve its texture characteristics.

References Cited in the file of this patent

UNITED STATES PATENTS

| Number | Name | Date |
|---|---|---|
| 1,967,235 | Ferkel | July 24, 1934 |
| 2,347,496 | Muskat | Apr. 25, 1944 |
| 2,489,246 | Wainer | Nov. 22, 1949 |
| 2,559,638 | Krchma et al. | July 10, 1951 |

OTHER REFERENCES

McPherson and Henderson: "General Chemistry," 3rd ed., page 164. Ginn and Co., N. Y.